United States Patent
Fleisch et al.

(10) Patent No.: US 8,178,149 B2
(45) Date of Patent: May 15, 2012

(54) METHOD AND APPARATUS FOR PRODUCING FRUIT LEATHER FROM A FRUIT MASS

(75) Inventors: Jens Fleisch, Wernigerode (DE); Erhard Hilker, Lemgo (DE); Klaus Markwardt, Laatzen (DE)

(73) Assignee: Chocotech GmbH, Wernigerode (DE)

( * ) Notice: Subject to any disclaimer, the term of this patent is extended or adjusted under 35 U.S.C. 154(b) by 272 days.

(21) Appl. No.: 12/403,567

(22) Filed: Mar. 13, 2009

(65) Prior Publication Data
US 2009/0169694 A1 Jul. 2, 2009

Related U.S. Application Data

(63) Continuation of application No. PCT/EP2007/007963, filed on Sep. 13, 2007.

(30) Foreign Application Priority Data

Sep. 15, 2006 (DE) .......................... 10 2006 043 338

(51) Int. Cl.
*A23L 1/05* (2006.01)
(52) U.S. Cl. ......... 426/573; 426/640; 426/616; 426/520
(58) Field of Classification Search .................. 426/465, 426/640, 615, 616, 520, 573
See application file for complete search history.

(56) References Cited

U.S. PATENT DOCUMENTS

| | | | | |
|---|---|---|---|---|
| 2,301,589 A | * | 11/1942 | Shepard | 34/236 |
| 3,955,003 A | | 5/1976 | Loos et al. | |
| 3,998,977 A | | 12/1976 | Rabeler | |
| 4,205,093 A | * | 5/1980 | Blake | 426/333 |
| 4,631,837 A | | 12/1986 | Magoon | |
| 5,000,972 A | * | 3/1991 | Nafisi-Movaghar | 426/333 |
| 5,523,103 A | | 6/1996 | Loalbo | |
| 5,554,410 A | | 9/1996 | Bell et al. | |
| 5,840,354 A | * | 11/1998 | Baumann et al. | 426/74 |
| 6,113,968 A | | 9/2000 | McGuire et al. | |
| 2002/0168460 A1 | * | 11/2002 | Soumya et al. | 426/575 |
| 2005/0181115 A1 | | 8/2005 | Markwardt et al. | |

(Continued)

FOREIGN PATENT DOCUMENTS

DE 2302242 B2 1/1973

(Continued)

OTHER PUBLICATIONS

English Translation of the International Preliminary Report regarding the related, co-pending PCT Application No. PCT/EP2007/007963.

(Continued)

*Primary Examiner* — Drew Becker
*Assistant Examiner* — Preston Smith
(74) *Attorney, Agent, or Firm* — Thomas, Kayden Horstemeyer & Risley, LLP

(57) ABSTRACT

A method and an apparatus (100, 100') serve to continuously produce fruit leather from a fruit mass. The fruit leather does not include added sugar or fat. The fruit mass includes a share of dry substance of at least 50% and a share of water. The fruit mass exposed to vacuum is cooked for less than one minute in a way to reduce the share of water in the fruit mass to increase the share of dry substance in the fruit mass to approximately between 80% to 90%. The fruit mass is then formed to attain the fruit leather.

8 Claims, 2 Drawing Sheets

U.S. PATENT DOCUMENTS

2008/0199571 A1     8/2008    Arsan et al.

FOREIGN PATENT DOCUMENTS

| | | |
|---|---|---|
| DE | 36 88 940 T2 | 6/1988 |
| DE | 40 19 916 AL A1 | 1/1992 |
| EP | 0 534 994 B1 | 4/1993 |
| EP | 1 566 105 A2 A2 | 8/2005 |
| JP | 012470848 A | 2/1989 |
| WO | WO 92/00016 A1 | 1/1992 |
| WO | 0135762 A1 | 5/2001 |
| WO | WO 2006/016897 A1 | 2/2006 |

OTHER PUBLICATIONS

"Handbuch der Lebensmittelchemie, V/2, Obst, Gemüse, Kartoffeln, Pilze", 1968, Springer, Berlin, XP00894691, pp. 192-195.

PCT International Search Report in Co-Pending Related PCT Application No. PCT/EP2007/007963, mailed Jul. 29, 2008.

* cited by examiner

METHOD AND APPARATUS FOR PRODUCING FRUIT LEATHER FROM A FRUIT MASS

CROSS REFERENCE TO RELATED APPLICATIONS

This application is a continuation of International Application PCT/EP2007/007963 with an International Filing Date of Sep. 13, 2007 and claiming priority to co-pending German Patent Application No. 10 2006 043 338.6 entitled "Verfahren und Vorrichtung zur Herstellung von Produkten aus Fruchtmasse", filed on Sep. 15, 2006.

FIELD OF THE INVENTION

The present invention generally relates to a method and an apparatus for producing fruit leather from a fruit mass.

Fruit leather is an eatable product substantially being made of a fruit mass. This means that the share of fruit mass in the product is at least 50%, especially up to 100%. A fruit mass is to be understood as a mass including a share of at least 50% of fruit, especially up to 100%.

BACKGROUND OF THE INVENTION

A method of producing products from a fruit mass is generally known in the art. The fruit mass is treated in batches, meaning discontinuously. The fruit mass is poured out on a support in the form of metal sheets, and the water content is reduced by drying to attain a leathery condition of the fruit mass. Usually, drying takes place over several days in ovens through which warm air flows. In this way, one attains a leathery fruit mass which is then cut into separate products. The shape of pieces or strips is realized by longitudinal cutting and transverse cutting. These products are also called "fruit leather".

An apparatus for drying fruit pulp and similar products is known from German Patent No. DE 36 88 940 T2 corresponding to U.S. Pat. No. 4,631,837. The fruit pulp is processed to attain a leathery condition. Drying is realized similar to a water bath by putting a thin film-like carrier material, especially an elongated strip of Mylar film, on a very long water channel, and by putting the fruit mass on the carrier material. The water is heated close to the boiling temperature such that the essential heat transfer to the fruit mass is realized by the carrier material. The drying operation takes about 2½ hours until the desired consistence of the leathery fruit mass has been reached.

A method of producing confectioneries including a substantial portion of sugar and other similar materials is known from PCT Application published as WO 2006/016897 A1 corresponding to US Patent Application No. US 2008/0199571 A1. Saccharides are used with a share of between 30% and 80%. Furthermore, thickening agents and water are added during production. It is also possible to use fruit masses as a component to influence the taste of the final product. The method is realized in batches, meaning discontinuously, by cooking the ingredients in a closed container for a long time and by stirring the mass such that one attains a mass having a share of dry substance between approximately 85% and 92%. The batch contained in the container is cooked and stirred for a comparatively long time between 15 minutes and 60 minutes. The container is designed to be closed to prevent water and steam from exiting. In certain applications, the container may also be opened for a certain period of time such that it is connected to atmospheric pressure. In this way, products always including a substantial portion of sugar are produced. The sugar has a substantial influence on the texture and structure of the final products. The products include thickening agents, for example pectin. The mass produced in batches is fed from a boiler by a pump, and it is formed to attain the single products using roller forming elements and longitudinal cutting elements and transverse cutting elements.

A method of producing products from fruit is known from U.S. Pat. No. 2,301,589. The fruit, for example apples, are initially washed and then fed to a tray for fruit sorting. The apples are then introduced into an open cooking apparatus from above such that they are cooked under the influence of atmospheric pressure. The mass resulting therefrom is then further processed by a pulper to attain a pulp. A cooking apparatus is located downstream of the pulper, the cooking apparatus operating under the influence of vacuum and sucking in the pulp in this way. The pulper itself operates under the influence of atmospheric pressure. The non-eatable components of the mass are discharged at that place. The mass is transported from the cooking apparatus into a tub and onto a heated carrier strip via a funnel. The mass is further dried on the carrier strip. The entire drying process for attaining the desired share of dry substance of the fruit mass is attained in a method including a plurality of steps and consequently taking a comparatively long period of time.

A method and an apparatus for continuously producing confectioneries from an aqueous solution of ingredients are known from European Patent Application No. EP 1 566 105 A2 corresponding to US Patent Application No. US 2005/0181115 A1. For example, the ingredients may be sugar, sweeteners, liquid glucose and the like. The ingredients are pumped through a helix cooker by a pump. Afterwards, they reach an evaporating chamber in which a vapor valve serves to discharge the vapors. A vacuum chamber is located downstream of the evaporating chamber, the vacuum chamber being separated from the evaporating chamber by a needle valve and being separated from the atmosphere by a discharging unit. The vacuum chamber and/or the evaporating chamber being under the influence of pressure below atmospheric pressure are used for introducing powdery and/or crystalline ingredients. The source of negative pressure is designed and operated to be slightly oversized such that the required vacuum in the vacuum chamber is maintained although there is an open connection to the surroundings. The apparatus is not suitable for producing products from a fruit mass.

A method of producing concentrated fruit juices is described in the German handbook of food chemistry "*Handbuch der Lebensmittelchemie, V/2, Obst, Gemüse, Kartoffeln, Pilze*"; 1968, SPRINGER, BERLIN, XP008094691, pages 192-195. The fruit juices are evaporated by different types of evaporators which may also be used in combination. The handbook describes long tube evaporators, thin layer evaporators, circuit evaporators, plate evaporators and centrifugal evaporators. In case such evaporators include great evaporating surfaces, they make it possible to reduce the evaporating temperatures and/or the residing times of the juices. Thin layer evaporators operate with extremely low liquid volumes and residing times about 30 seconds, but at a very high temperature difference between the heating medium and the goods to be evaporated. Fruit juices which are evaporated for producing juice concentrates substantially differ from leathery fruit. Fruit juice concentrates serve to be later filled up with water to attain a fruit juice, while this is never realized with leathery fruit.

A method of packaging food is known from U.S. Pat. No. 3,955,003. For example, a leaf made of caramel is produced, and an apple is then wrapped up in the leaf. For producing the caramel, meaning a confectionery, a thin layer vacuum evaporator is used for increasing the share of the dry substance of the confectionery mass to approximately 85%.

A method and an apparatus for continuously producing confectioneries in the form of hard candy including sugar or sweeteners are known from German Patent Application No. DE 40 19 916 A1 corresponding to PCT Application published under WO 92/00016 A1 and European Patent No. EP 0 534 994 B1. The solved sugar or sweeteners are heated in a flow heater until they reach the boiling temperature. They are transported into an evaporating chamber at atmospheric pressure and then into a vacuum chamber being under the influence of vacuum for further evaporation. Such an apparatus is not suitable for producing fruit leather.

A method of introducing fruit juices in a hard candy mass is known from U.S. Pat. No. 5,554,410. A vacuum cooking apparatus is used for cooking. A chamber being under the influence of atmospheric pressure is located downstream. A vacuum chamber is located downstream of this chamber.

SUMMARY OF THE INVENTION

The present invention relates to a method of continuously producing fruit leather from a fruit mass. The fruit leather does not include added sugar or fat. The fruit mass includes a share of dry substance of at least 50% and a share of water. The fruit mass is cooked exposed to vacuum for less than one minute in a way to reduce the share of water in the fruit mass to increase the share of dry substance in the fruit mass to approximately between 80% to 90%. The fruit mass is then formed to attain the fruit leather.

The present invention also relates to an apparatus for continuously producing fruit leather from a fruit mass. The fruit leather does not include added sugar or fat. The fruit mass includes a share of dry substance of at least 50% and a share of water. The apparatus includes a processing unit for the fruit mass and a discharging unit for the fruit leather. The processing unit includes a thin film cooking apparatus, an evaporating chamber and a vacuum pump. The evaporating chamber is arranged downstream of the thin film cooking apparatus and it has a lower end. The vacuum pump is connected to the evaporating chamber, and it is designed and arranged to produce a vacuum in the evaporating chamber. The processing unit is designed and arranged to cook the fruit mass exposed to vacuum for less than one minute in a way to reduce the share of water in the fruit mass and to increase the share of dry substance in the fruit mass to approximately between 80% and 90%. The discharging unit is arranged at the lower end of the evaporating chamber, and it is designed and arranged to discharge the dried fruit leather from the evaporating chamber.

With the novel method and apparatus, it is desired to produce products having a very high share of fruit mass without adding sugar or fat. The products at the most include a share of sugar resulting from the natural sugar of the fruit. In this way, one attains a very natural and healthy product. Such a product is called dried fruit or "fruit leather" (also see WIKIPEDIA).

The fruit mass being used for producing such a product may be fruit puree, natural fruit juice, concentrated or condensed fruit juice, fruit concentrate, fruit mesh, fruit pulp or a combination of these products. It is important to realize that such products made from fruit mass are not confectioneries since neither sugar nor fat is introduced during manufacture.

With the novel method and apparatus, it is possible to continuously produce products from fruit mass without adding sugar or fat. The substantial component of the products is a fruit mass, and the final products have a share of the dry fruit mass of between 80% and 90%. The products may include comparatively low shares of filling materials such as flavors, colors, liquid glucose, pectin, glucose, fructose, and the like. Such a product is achieved by reducing the share of water of the fruit mass by continuously cooking the fruit mass under the influence of vacuum for a short period of time.

In contrast to prior art methods, drying does not take place for several hours or even days, but instead only for a very short period of time. This short-term cooking serves for attaining gentle treatment of the fruit mass during drying. The components of the fruit mass such as fruit pulp, fruit fibers, and the like, are not negatively influenced, but they are instead to be found in the final product more or less in the same way as they originally were in the fruit mass before cooking. Vitamins and other valuable components of the fruit mass are also not negatively influenced such that one attains a very healthy product being very similar to the natural condition of fruit. Neither sugar nor fat nor oil is added to the fruit mass. The components of the fruit mass are processed in a reservoir being located upstream such that the fruit mass can be pumped through conduits. This serves to continuously process the fruit mass and to cook it under the influence of vacuum for a short period of time.

The continuous short-term cooking of the fruit mass is realized at comparatively low temperatures, especially at temperatures below 120° C. When processing especially delicate fruit masses, the temperature may even be lowered below 100° C.

Continuously cooking allows for providing a constant product quality. The quality does no longer depend on different conditions as they occur when producing such masses discontinuously. Due to the short residing time of the fruit mass in the cooking apparatus and the short total production time, the fruit mass is gently treated without substantial negative influences.

After short-term cooking of the fruit mass, the resulting leathery fruit mass ("fruit leather") is conveyed into the atmosphere, and the products are formed under the influence of the atmospheric pressure. Between cooking and forming of the mass, it is possible to introduce colors, flavors and other filling materials excluding sugar, fat and oil. The products may be formed in different ways, especially by rollers or by an extruder with which lines or other elongated products of various cross-sections can be produced.

It is especially preferred to continuously cook the fruit mass according to the "thin film method" with a residing time of the fruit mass in the thin film cooking apparatus of approximately between 15 to 20 seconds. The thin film method uses a thin film cooking apparatus including a rotor and a stator. A comparatively small annular gap is formed between the rotor and the stator. The rotor in the region of the gap includes a plurality of scraping elements serving to repeatedly remove the mass from the heat transfer surfaces and to mix the mass. The thin film cooking apparatus may be heated by steam, electrically or in a different way.

Depending on the desired dry substance of the final product, short-term cooking may be realized at a vacuum with a pressure of approximately between 95000 and 30000 Pascal, preferably approximately between 70000 and 30000 Pascal. When using the thin film method, it is possible to cook the mass at temperatures of less than 100° C. On the other hand, it is also possible to apply pressures below atmospheric pressure in a range of approximately between 95000 to 70000 Pascal such that the fruit mass has a temperature of approximately between 115° C. to 108° C.

The novel apparatus for producing products from fruit mass includes a processing unit for the fruit mass and a forming unit for forming the leathery fruit mass to attain the single products. The processing unit includes a thin film cooking apparatus and an evaporating chamber including a vacuum pump, the evaporating chamber being under the influence of vacuum and being located downstream of the thin film cooking apparatus. A discharging unit is arranged at the lower end of the evaporating chamber, the discharging unit serving to discharge the dried fruit mass ("fruit leather"). The thin film cooking apparatus as an element of the novel apparatus is generally known for producing confectioneries. Such a thin film cooking apparatus includes a rotor and a stator, the mass flowing through the gap between the rotor and the stator. The rotor includes a plurality of scraping elements being designed and arranged to repeatingly remove the mass from the surface of the stator and to mix the mass. Such a thin film cooking apparatus may be heated by steam. An evaporating chamber is located downstream of the thin film cooking apparatus, the evaporating chamber being under the influence of vacuum being produced by a vacuum pump. It is also possible that the thin film cooker and a respective portion thereof, respectively, is under the influence of vacuum by a connecting conduit being arranged between the evaporating chamber and the thin film cooking apparatus. On the one hand, the vacuum pump serves to produce the desired negative pressure. On the other hand, it serves to remove the vapors. In this way, the fruit mass is dried in the evaporating chamber in a way that the share of dry substance is substantially increased to be in a region of approximately between 80% and 90%. In this way, one attains a fruit leather which is a very healthy product that may also be consumed by children instead of undesired products including sugar and fat.

The novel apparatus is operated to continuously produce fruit leather of constant quality in a reproducible way. The required space is very small, especially when comparing it to drying chambers known from the prior art in which the mass is located on large metal sheets and the like on which the mass is dried for many hours or even days. The short residing time in the thin film cooking apparatus has a positive influence on the quality of the product. The components of the fruit mass are gently treated. Components such as vitamins, but also the structure of the fruit mass, for example the fruit fibers and the fruit pulp, are not damaged.

The vacuum pump may be designed and arranged to produce a pressure below atmospheric pressure of approximately between 95000 to 30000 Pascal and to discharge the vapors being produced during cooking. In this way, substantial drying takes place in the evaporating chamber. The used pressures depend on the properties of the fruit contained in the fruit mass and the desired dry substance in the final product. When using a pressure of 95000 Pascal in the evaporating chamber, the fruit mass has a temperature of approximately 115° C. When using pressure of approximately 70000 Pascal, the temperature of the fruit mass is approximately 108° C. When using a vacuum with a pressure of approximately 30000 Pascal, the fruit mass has a temperature of approximately 90° C.

It is especially advantageous if the discharging unit includes a vacuum helix. Such a vacuum helix or vacuum screw allows for effectively sealing the evaporating chamber, especially when a substantial vacuum prevails. However, it is also possible that the discharging unit includes a displacement pump to convey the leathery fruit mass from the evaporating chamber under the influence of vacuum into the atmosphere and to there continue processing of the mass.

The discharging unit may be connected to the forming unit by a conduit in which one or more adding stations for adding colors and/or flavors are located. Usually, there also is a static mixer to mix the fruit mass with the colors and/or the flavors before the mass reaches the place where its shape is formed. The shape of the mass may be formed in different ways, especially be using rollers as forming elements with which a continuous strip of the mass is formed which may be cut in a longitudinal direction and in a transverse direction to attain bar-like products. However, it is also possible to use an extruder as the forming element with which lines of different cross-sections can be produced, these lines being cut in a transverse direction to attain the final products.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
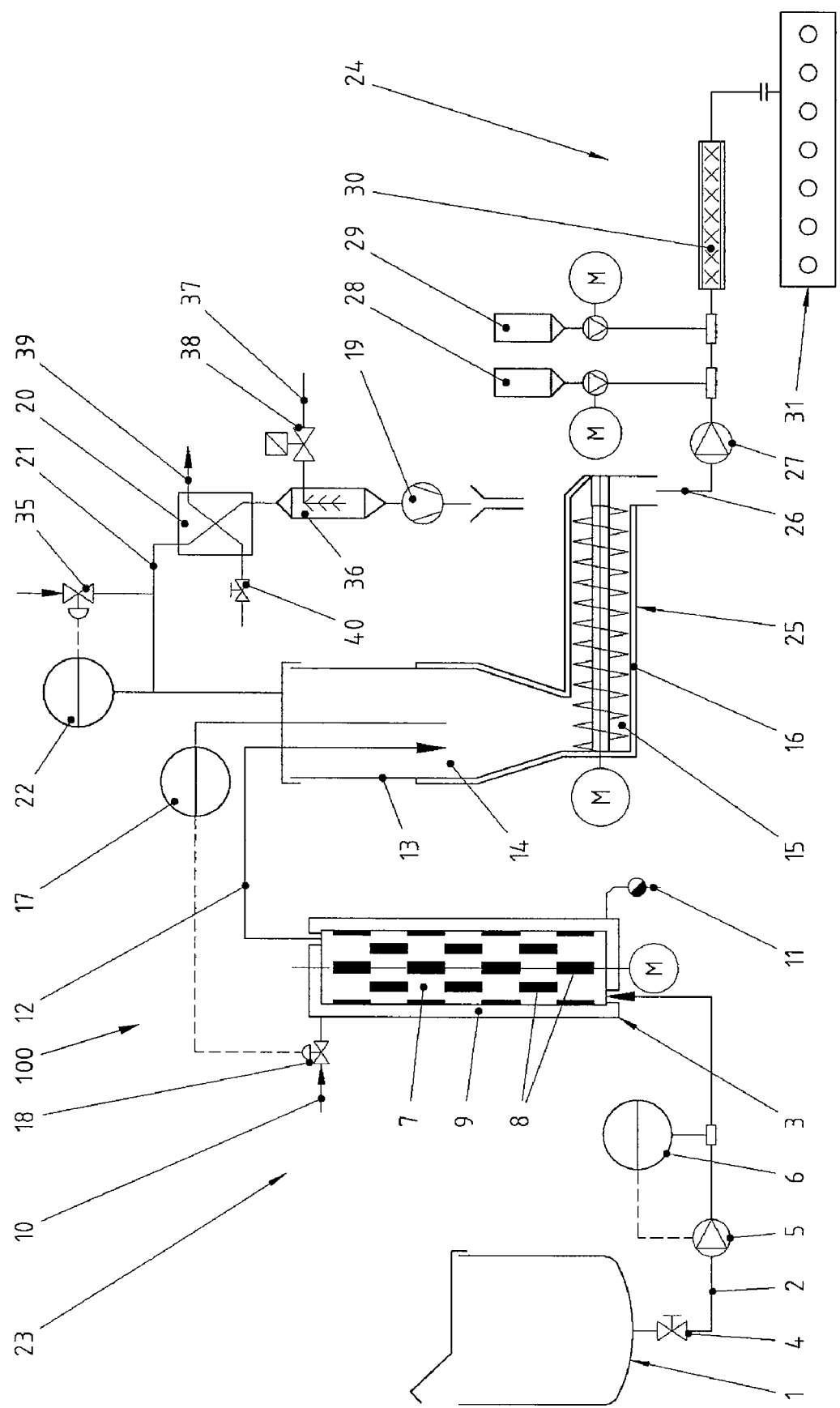
FIG. 1 is a view of a first exemplary embodiment of the novel apparatus for producing fruit leather from fruit mass.

Referring now in greater detail to the drawings, FIG. 1 illustrates a first exemplary embodiment of the novel apparatus 100 for producing fruit leather from fruit mass. The apparatus 100 includes a reservoir 1 being located in a beginning portion of the apparatus 100 as seen in the direction of the material flow. The reservoir 1 is under the influence of the atmosphere, and it is designed and arranged to contain a fruit mass. It serves to continuously feed the fruit mass to the other elements of the apparatus 100. A conduit 2 leads from the reservoir 1 to a thin film cooking apparatus 3. A valve 4, a pump 5 and a flow meter 6 are arranged in the conduit 2. The flow meter 6 serves to adjust flow rates of the fruit mass being fed to the thin film cooking apparatus 3 by the pump 5.

The thin film cooking apparatus 3 includes a rotor 7 being driven by a motor, the rotor 7 at its circumference including a number of scraping elements 8 being arranged in a displaced manner. The thin film cooking apparatus 3 also includes a stator in a way that a comparatively thin gap between the rotor 7 and the stator is formed, the fruit mass being pumped through the gap by the pump 5. The thin film cooking apparatus 3 includes a jacket 9 being connected to a steam conduit 10 serving to heat the thin film cooking apparatus 3. The condensate being produced thereby is discharged via a conduit 11.

A conduit 12 leads from the thin film cooking apparatus 3 to a closed container 13 forming an evaporating chamber 14. The fruit mass is evaporated in the evaporating chamber 14, meaning it is dried. A vacuum helix 15 is arranged at the lower end of the container 13 and of the evaporating chamber 14, respectively. The vacuum helix serves to seal the vacuum prevailing in the evaporating chamber 14 towards the outside and also to convey the fruit mass in a way to exit the evaporating chamber 14. The container 13 and/or the vacuum helix 15 may include a heating installation 16.

A temperature control device 17 serves to sense and determine the temperature of the mass in the evaporating chamber 14 and to control a valve 18 being located in the steam conduit 10. The temperature control device 17 serves to maintain the temperature of the mass in the evaporating chamber 14 approximately constant. A unit for producing a vacuum is connected to the evaporating chamber 14, the unit including a vacuum pump 19. A heat exchanger 20 is located in the conduit 21 leading from the vacuum pump 19 to the evaporating chamber 14. A conduit 39 extends through the heat exchanger 20. Cold water flows through the conduit 39. A control valve 40 makes it possible to adjust and control the amount of flowing mass per time unit. The vacuum pump 19 serves to produce the required vacuum in the evaporating chamber 14, and to discharge the vapors resulting from the fruit mass being dried. In this way, the share of dry substance is increased. A manometer 22 is arranged in the conduit 21, the manometer 22 serving to watch the vacuum prevailing in the evaporating chamber 14. The manometer 22 controls a control valve 35 through which ambient air may enter the conduit 21. The control is realized in a way that the vacuum prevailing in the evaporating chamber 14 is adjusted and maintained approximately constant (meaning at an approximately constant pressure). The conduit 21 leads from the heat exchanger 20 to a vacuum pump 19 via a spray condenser 36. The spray condenser 36 may be located on the vacuum pump 19. Service water flows into the spray condenser 36 via a conduit 37, the service water being required for correct operation of the vacuum pump 19. An electromagnetic controllable control valve 38 is located in the conduit 37. The above described elements of the apparatus 100 are part of a processing unit 23 serving to attain gentle and quick drying of the fruit mass.

The apparatus 100 also includes a forming apparatus 24. The forming apparatus 24 may be designed in different ways, as it is for example illustrated in FIGS. 1 and 2.

The vacuum helix 15 serves as a discharging unit 25. A conduit 26 leads from the end of the discharging unit 25 and of the vacuum helix 15, respectively, to the forming unit 24. A pump 27 may be arranged in the conduit 26, especially in case forming being realized in the forming station 24 requires a greater pressure. An adding station 28 serving to add color and another adding station 29 serving to add flavors are located in the conduit 26. A static mixer 30 is also located in the conduit 26, the mixer 30 serving to mix the dried fruit mass and the added colors and flavors. The forming apparatus 24 includes an extruder 31 including a multitude of exits, as illustrated, serving to produce lines of fruit mass. These lines may have various cross-sections. For attaining the fruit products, they only need to be cut in a transverse direction.

The apparatus 100 according to FIG. 1 is operated as follows:

A mixture of fruit puree, concentrated fruit juice and pectin in the form of a homogeneous solution is produced and introduced into the reservoir 1. The solution is suitable to be pumped, and it includes a share of dry substance of approximately 50%. This fruit mass to be processed is fed from the reservoir 1 by the pump 5 through the conduit into the thin film cooking apparatus 3. The thin film cooking apparatus 3 at its rotor 7 has a comparatively great diameter, while the gap between the rotor 7 and the stator is comparatively thin. The vacuum prevailing in the evaporating chamber 14 also prevails in the region of the gap of the thin film cooking apparatus 3 due to the conduit 12. Consequently, the fruit mass is cooked under the influence of vacuum. The residing time of the fruit mass in the thin film cooking apparatus 3 is less than a minute and preferably approximately between 15 and 20 seconds, and it is realized at comparatively low temperatures depending on the pressure of the vacuum that is used.

When using a vacuum with a pressure of approximately 95000 Pascal (950 mbar), the cooking temperature is approximately 115° C. When using a vacuum with a pressure of 70000 Pascal (700 mbar), the cooking temperature may be approximately 108° C. When using a vacuum of approximately 30000 Pascal (300 mbar), the cooking temperature may even by approximately 90° C. Such comparatively low temperatures are intended to be used not to harm the fruit and to ensure that the fruit components and the fibers of the fruit remain intact and unground. Steam consumption for heating the thin film cooking apparatus is comparatively low. The rotor may be operated at numbers of rotation in a region of approximately between 250 and 400 revolutions per minute. The fruit mass does not include added sugar, but instead at the most natural fruit sugar the inversion of which is prevented by the very short residing time. The temperature controller 17 serves to control the desired cooking temperature. The manometer 22 serves to watch the vacuum in the evaporating chamber 14, the vacuum being maintained as constant as possible. The method conducted with the novel apparatus 100 is a continuous method with which fruit mass is continuously processed. The fruit mass is not discontinuously processed in batches. The mass being heated in the thin film cooking apparatus 3 is conveyed through the conduit 12 into the evaporating chamber 14 of the container 13. The vacuum is maintained by the vacuum pump 19, and it also discharges the vapors which have condensed in the heat exchanger 20. In this way, the share of the dry substance in the fruit mass is increased to attain a value of approximately between 80 to 90%. The discharging unit 25 being designed as the vacuum helix 15 serves to convey the fruit mass from the evaporating chamber 14 into the conduit 26 and to further convey the fruit mass towards the forming apparatus 24 including the extruder 31. Adding stations 28, 29 for colors and flavors may be arranged. The static mixer 30 serves to uniformly mix the fruit mass and the added colors and flavors.

Figure 2:
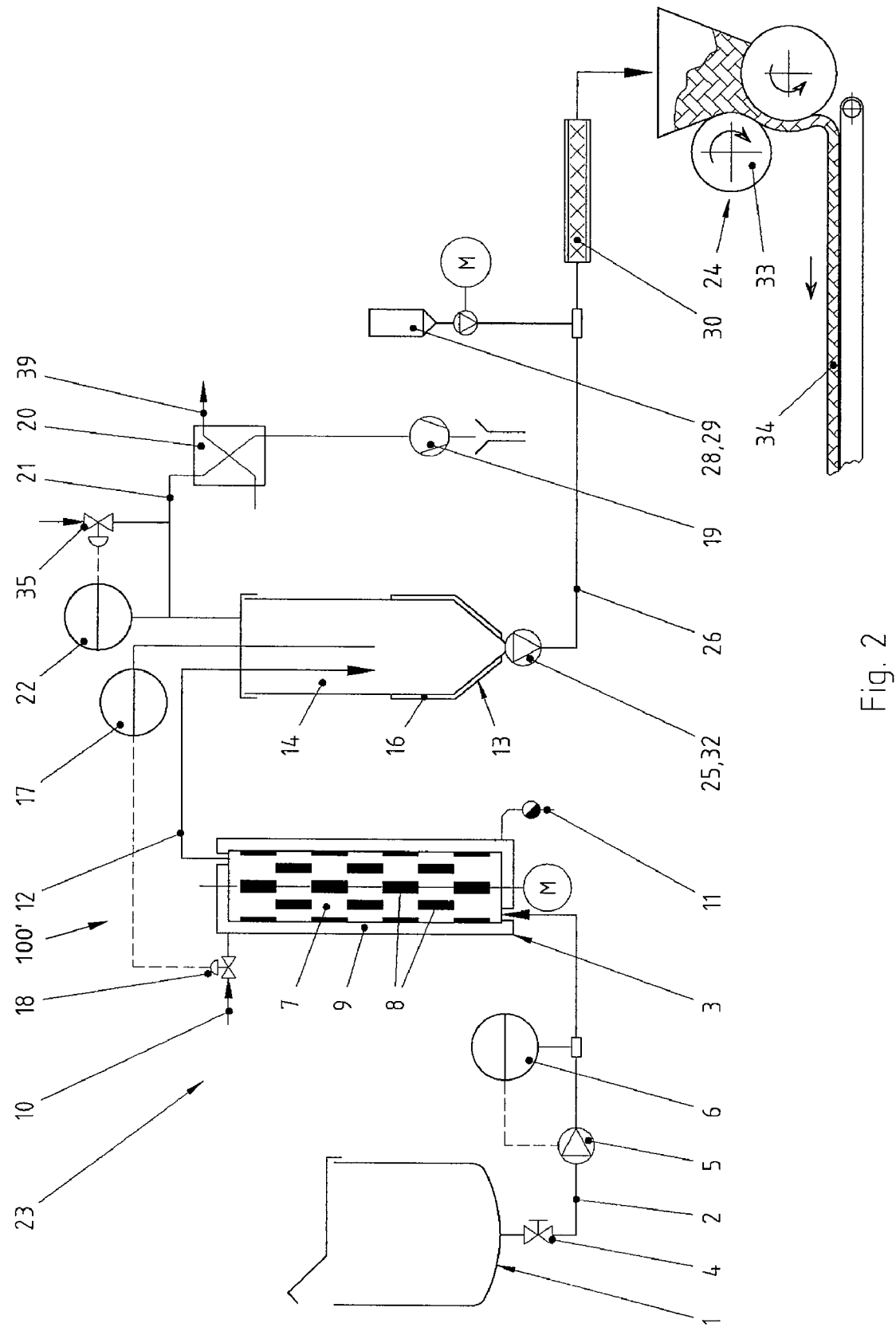
FIG. 2 is a view of a second exemplary embodiment of the novel apparatus for producing fruit leather from fruit mass.

FIG. 2 illustrates another exemplary embodiment of the novel apparatus 100' for producing fruit leather from a fruit mass. The apparatus 100' has many features in common with the apparatus 100 such that it is referred to the above description. In contrast, the discharging unit 25 is designed as a displacement pump 32 being arranged at the lower end of the container 13 and of the evaporating chamber 14, respectively. The displacement pump 32 removes the fruit mass from the evaporating chamber 14 and introduces it into the conduit 26. The heat exchanger 20 may be connected to a circuit for service water. The spray condenser 36 may also be omitted. The forming apparatus 24 is designed as a roller forming apparatus 33 serving to produce an elongated flat strip 34 of fruit mass. This strip 34 is then cut into sections by longitudinal cutting and transverse cutting.

The pressures below atmospheric pressure preferably used in the apparatus 100' according to FIG. 2 is approximately in a region of between 95000 to 70000 Pascal resulting in cooking temperatures and evaporating temperatures of the fruit mass of approximately between 115° C. and 108° C. The novel apparatus 100' also operates in a fast and gentle way such that the fruit mass is dried during a period of time which is less than a minute.

Many variations and modifications may be made to the preferred embodiments of the invention without departing substantially from the spirit and principles of the invention. All such modifications and variations are intended to be included herein within the scope of the present invention, as defined by the following claims.

We claim:

1. A method of continuously producing fruit leather from a fruit mass, comprising the steps of:
    cooking the fruit mass, wherein the fruit mass includes a share of dry substance of at least 50% and a share of water, exposed to vacuum for approximately 15 to 20 seconds in a way to reduce the share of water in the fruit mass and to increase the share of dry substance in the fruit mass to approximately between 80% and 90%; and
    forming the fruit mass to attain the fruit leather, wherein the fruit leather does not include added sugar or fat.

2. The method of claim 1, wherein the fruit mass is cooked at a temperature of less than 120° C.

3. The method of claim 1, wherein the fruit mass after cooking is exposed to atmospheric pressure to form the products at atmospheric pressure.

4. The method of claim 1, wherein the fruit mass is cooked at a pressure of approximately between 95000 and 30000 Pascal.

5. The method of claim 2, wherein the fruit mass is cooked at a pressure of approximately between 95000 and 30000 Pascal.

6. The method of claim 3, wherein the fruit mass is cooked at a pressure of approximately between 95000 and 30000 Pascal.

7. A method of continuously producing fruit leather from a fruit mass, comprising the steps of:
    cooking the fruit mass, wherein the fruit mass includes a share of dry substance of at least 50% and a share of water, exposed to vacuum for approximately 15 to 20seconds at a temperature of less than 120° C. and at a pressure of approximately between 95000 and 30000 Pascal in a way to reduce the share of water in the fruit mass and to increase the share of dry substance in the fruit mass to approximately between 80% and 90%; and
    forming the fruit mass to attain the fruit leather, wherein the fruit leather does not include added sugar or fat.

8. A method of continuously producing fruit leather from a fruit mass, comprising the steps of:
    cooking the fruit mass, wherein the fruit mass includes a share of dry substance of at least 50% and a share of water, exposed to vacuum for less than one minute at a temperature of less than 120° C. and at a pressure of approximately between 95000 and 30000 Pascal in a way to reduce the share of water in the fruit mass and to increase the share of dry substance in the fruit mass to approximately between 80% and 90%; and
    forming the fruit mass to attain the fruit leather, wherein the fruit leather does not include added sugar or fat.

* * * * *